United States Patent
Yamada et al.

(10) Patent No.: US 7,033,452 B2
(45) Date of Patent: Apr. 25, 2006

(54) METHOD FOR PLUGGING A CELL OF A HONEYCOMB STRUCTURE AND METHOD FOR MANUFACTURING A HONEYCOMB PLUGGED STRUCTURE

(75) Inventors: Toshio Yamada, Nagoya (JP); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 7 days.

(21) Appl. No.: 10/694,998

(22) Filed: Oct. 29, 2003

(65) Prior Publication Data

US 2004/0131772 A1    Jul. 8, 2004

(30) Foreign Application Priority Data

Nov. 8, 2002   (JP) ............................. 2002-325514
Sep. 24, 2003  (JP) ............................. 2003-331770

(51) Int. Cl.
*B28B 11/00*   (2006.01)
*C04B 33/34*   (2006.01)

(52) U.S. Cl. .................. 156/89.22; 156/293; 264/630; 55/523; 55/524

(58) Field of Classification Search ............ 156/89.11, 156/89.22, 293, 294; 264/630, 631; 55/523, 55/524, 502
See application file for complete search history.

(56) References Cited

U.S. PATENT DOCUMENTS

| | | | | |
|---|---|---|---|---|
| 4,509,966 A | * | 4/1985 | Dimick et al. ................. | 55/502 |
| 4,559,193 A | * | 12/1985 | Ogawa et al. ................ | 264/631 |
| 4,718,926 A | * | 1/1988 | Nakamoto et al. ............. | 55/523 |
| 5,116,689 A | * | 5/1992 | Castro et al. ................ | 428/593 |
| 5,876,831 A | * | 3/1999 | Rawal ......................... | 428/117 |
| 6,630,221 B1 | * | 10/2003 | Wong .......................... | 428/117 |
| 6,800,107 B1 | * | 10/2004 | Ishihara et al. ............... | 55/523 |
| 2002/0020944 A1 | | 2/2002 | Yamaguchi et al. | |
| 2002/0078667 A1 | * | 6/2002 | Ishihara et al. ............. | 55/282.3 |
| 2004/0053005 A1 | * | 3/2004 | Hamanaka et al. ......... | 428/116 |
| 2004/0068971 A1 | * | 4/2004 | Kuki et al. ................... | 55/523 |
| 2005/0076991 A1 | * | 4/2005 | Fujita ....................... | 156/89.22 |

FOREIGN PATENT DOCUMENTS

| | | |
|---|---|---|
| JP | B2 63-24731 | 5/1988 |
| JP | 01-192504 | 8/1989 |
| JP | 01-259905 | 10/1989 |
| JP | 1-259905 | * 10/1989 |
| JP | 3-74512 | * 3/1991 |
| JP | 3-275110 | * 12/1991 |
| JP | 10-99624 | * 4/1998 |
| JP | B2 3012167 | 12/1999 |
| JP | A 2001-300922 | 10/2001 |
| JP | A 2002-309922 | 10/2002 |

* cited by examiner

*Primary Examiner*—Melvin Mayes
(74) *Attorney, Agent, or Firm*—Oliff & Berridge, PLC (57) ABSTRACT

There are disclosed a method for plugging a cell of a honeycomb structure and a method for manufacturing a honeycomb plugged structure. By the methods, plug portion having arbitrary depth and/or shape can exactly and relatively easily be formed. There is disclosed the method for plugging cell 3 of a honeycomb structure 1 having a plurality of cells surrounded by partition walls and extending through an axial direction. In the method for plugging the cells of the honeycomb structure, plugging member 6 molded in predetermined shape is inserted into the cell 3, and the plugging member 6 is bonded to the peripheral partition walls 3 to form plug portions. There is also provided the method for manufacturing the honeycomb plugged structure, including the steps of: plugging at least a certain cells of the honeycomb structure by this plugging method.

14 Claims, 9 Drawing Sheets

METHOD FOR PLUGGING A CELL OF A HONEYCOMB STRUCTURE AND METHOD FOR MANUFACTURING A HONEYCOMB PLUGGED STRUCTURE

BACKGROUND OF THE INVENTION

1. Field of the Invention

The present invention relates to a method for plugging a cell of a honeycomb structure and a method for manufacturing a honeycomb plugged structure, particularly to a method for plugging the cell in which plug portion having desired depth and/or desired shape can correctly and relatively easily be formed, and a method for manufacturing a honeycomb plugged structure using the plugging method.

2. Description of the Related Art

Figure 10A:
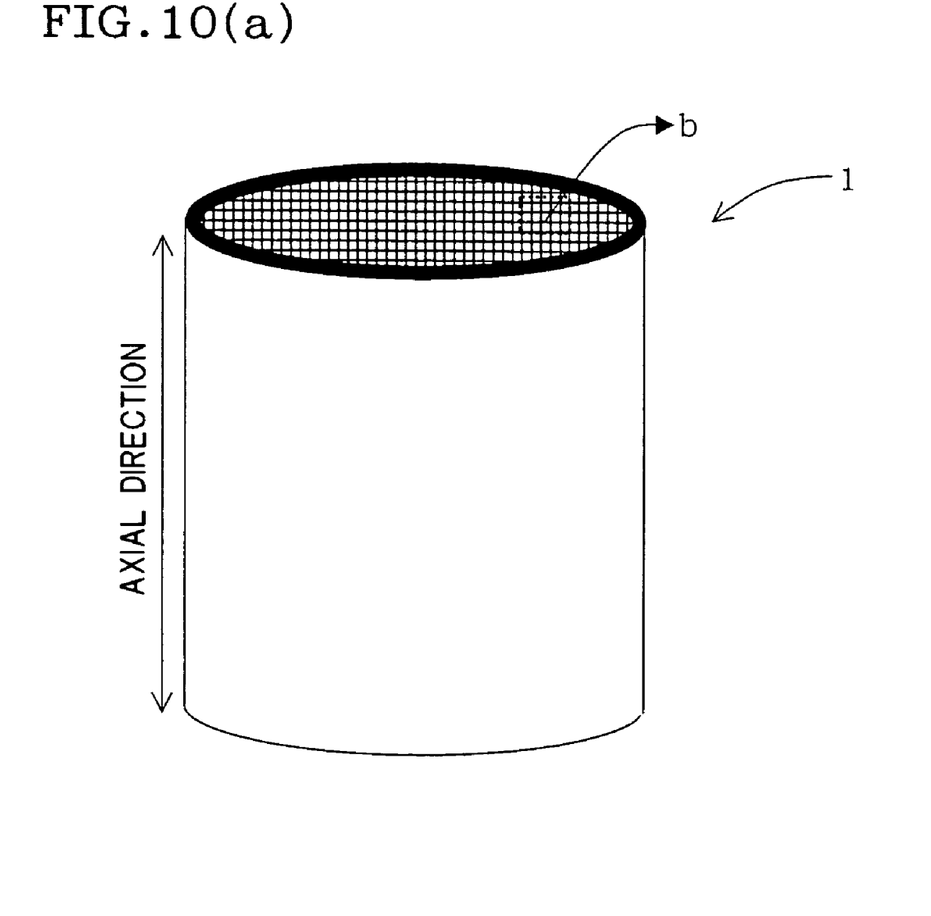
FIG. 10(a) is a perspective view schematically showing one example of a general honeycomb structure.
Figure 10B:
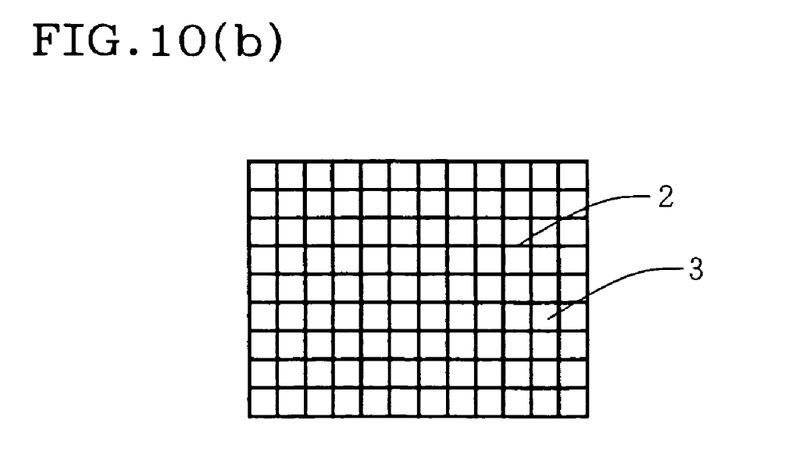
FIG. 10(b) is a partially enlarged plan view of FIG. 10(a)
Figure 11A:
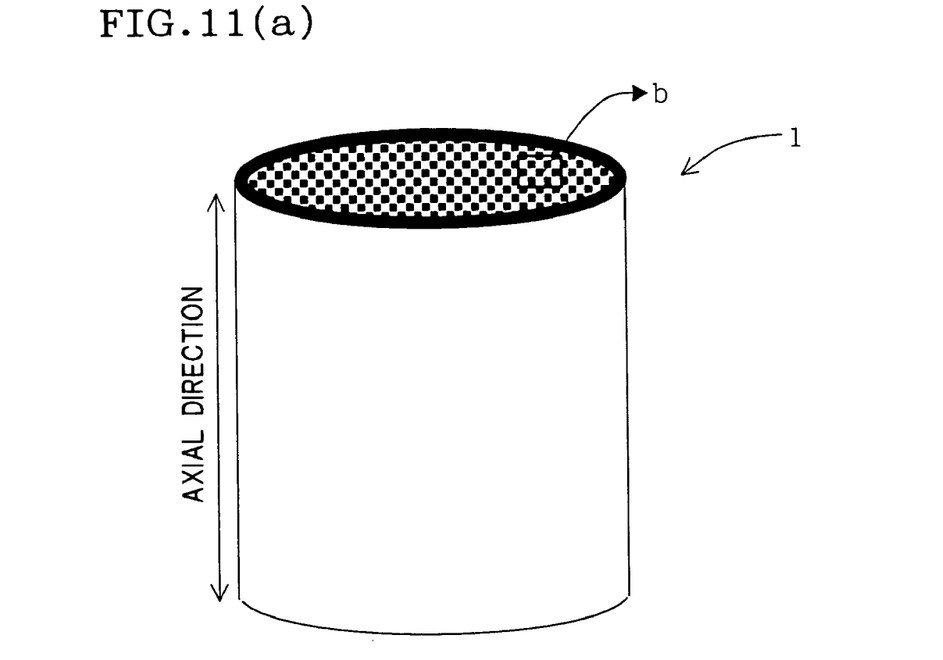
FIG. 11(a) is a perspective view schematically showing one example of a general honeycomb structure.
Figure 11B:
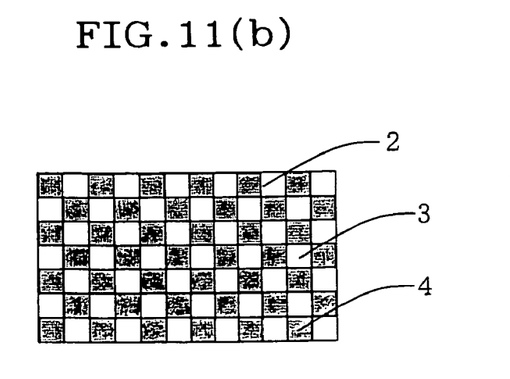
FIG. 11(b) is a partially enlarged plan view of FIG. 11(a)
Figure 11C:
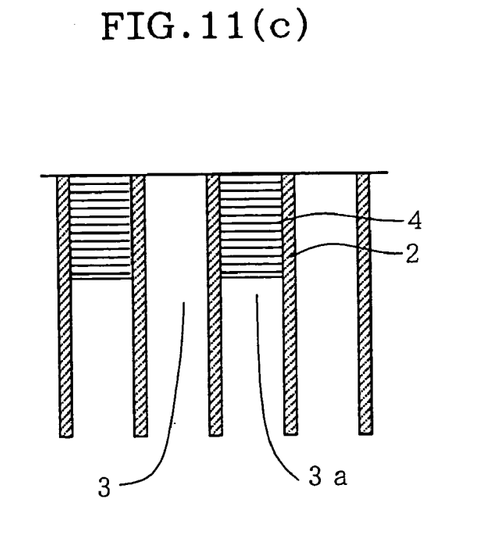
FIG. 11(c) is a partially enlarged sectional view parallel to the axial direction of the honeycomb plugged structure of FIG. 11(a).

As shown in FIGS. 10(a) and 10(b), a honeycomb structure includes a plurality of cells 3 surrounded by partition walls 2 and extending through an axial direction, and has broadly been used as a catalyst substrate, filter, or the like. Depending on cases, especially in a case where the honeycomb structure is used as a filter, the honeycomb structure is used in the form of a honeycomb plugged structure in which some cells 3a are plugged by plug portions 4 as shown in FIGS. 11(a) to 11(c). These plug portions have heretofore been formed by charging ceramic slurry into desired cells and drying and/or firing the slurry (see JP-B-63-24731).

For example, when the honeycomb plugged structure is used as a filter for purifying exhaust gas of a diesel engine (hereinafter referred to as DPF), the body is sometimes exposed at a high temperature depending on the environments. Stresses such as a thermal stress are concentrated on boundaries between the plug portions and the cells, and it causes a possibility that cracks are easily made in the partition walls of the concentrated portions.

To solve such a problem, a filter has been proposed in which the boundaries between the plug portions and the cells is not in a linear or constant pattern (see JP-B-3012167). This feature has an effect of avoiding the concentration of the stress. However, in order to prevent the boundaries between the plug portions and the cells from having the constant pattern, an amount of the slurry to be charged in the cell needs to be changed for each cell, and this requires an excess steps. Even when the boundaries between the plug portions and the cells are formed in the constant or linear pattern, it has been difficult to form the plug portion having an exact depth in the conventional method.

SUMMARY OF THE INVENTION

The present invention has been developed in consideration of these situations, and a feature thereof is to provide a method for plugging a cell of a honeycomb structure in which plug portion having arbitrary depth and/or shape can exactly and relatively easily be formed, and a method for manufacturing a honeycomb plugged structure using the plugging method.

According to the present invention, there is provided a method for plugging a cell of a honeycomb structure having a plurality of cells surrounded by partition walls and extending through an axial direction, the method comprising steps of: inserting a plugging member formed in predetermined shape into the cell; and bonding the plugging member to the partition walls surrounding the plugging member, to form a plug portion. There is also provided a method for manufacturing a honeycomb plugged structure, comprising the steps of: plugging at least a certain cells of the honeycomb structure by the plugging method.

In the present invention, the plugging member is preferably an unfired ceramic molded body, and the plugging member is further preferably a unfired ceramic molded body formed by extrusion molding and/or press molding. Furthermore, the plugging member is also preferably a ceramic fired body, and further the plugging member is also preferably a ceramic fired body which is formed by extrusion molding and/or press molding, and subsequently firing. Moreover, it is also preferred that the plugging member comprises a through slot and the plug portion is formed so that the through slot extends through the axial direction, and also preferred that the plugging member has a columnar shape.

Moreover, it is also preferred that the plugging member comprises a concave portion, and the plug portion is formed so that the concave portion forms a concave in relation to a surface parallel to an end face of the honeycomb structure. Alternatively, it is also preferred that the plugging member comprises a convex portion, and the plug portion is formed so that the convex portion forms a convex in relation to a surface parallel to an end face of the honeycomb structure. In this case, the convex portion further preferably comprises a portion having a pyramid shape or a conical shape. The plugging member preferably has a spherical shape. Moreover, it is also preferred that it comprises steps of disposing a ceramic-containing bond material between the plugging member and the partition wall surrounding the plugging member, and firing the bond material to bond the plugging member and the partition wall, to form the plug portion. Furthermore, a major component of the bond material is preferably the same as that of at least one of the honeycomb structure and the plugging member. The plugging member preferably contains, as the major component, at least one material selected from a group consisting of cordierite, alumina, mullite, silicon nitride, and silicon carbide. The plugging member preferably has a catalytic activity, also the plugging member preferably carries or contains a catalytic component. The plugging member and the honeycomb structure preferably contain the same ceramic as the major component.

According to the method for plugging a cell of a honeycomb structure and the method for manufacturing a honeycomb plugged structure of the present invention, the plug portion having arbitrary depth and/or shape can exactly and relatively easily be formed.

DESCRIPTION OF THE PREFERRED EMBODIMENTS

A method for plugging cells and a method for manufacturing a honeycomb plugged structure according to the present invention will hereinafter be described in detail based on the specific embodiments, but the present invention is not limited to the following embodiments. It is to be noted that in the following description, a "section" means a vertical section to an axial direction (e.g., the axial direction shown in FIG. 1(a)) unless otherwise specified. Moreover, a "honeycomb plugged structure" means a honeycomb structure in which plug portions are formed in at least a certain cells, and the "honeycomb structure" means a honeycomb structure in which the plug portions are not formed in the cells.

Figure 1A:
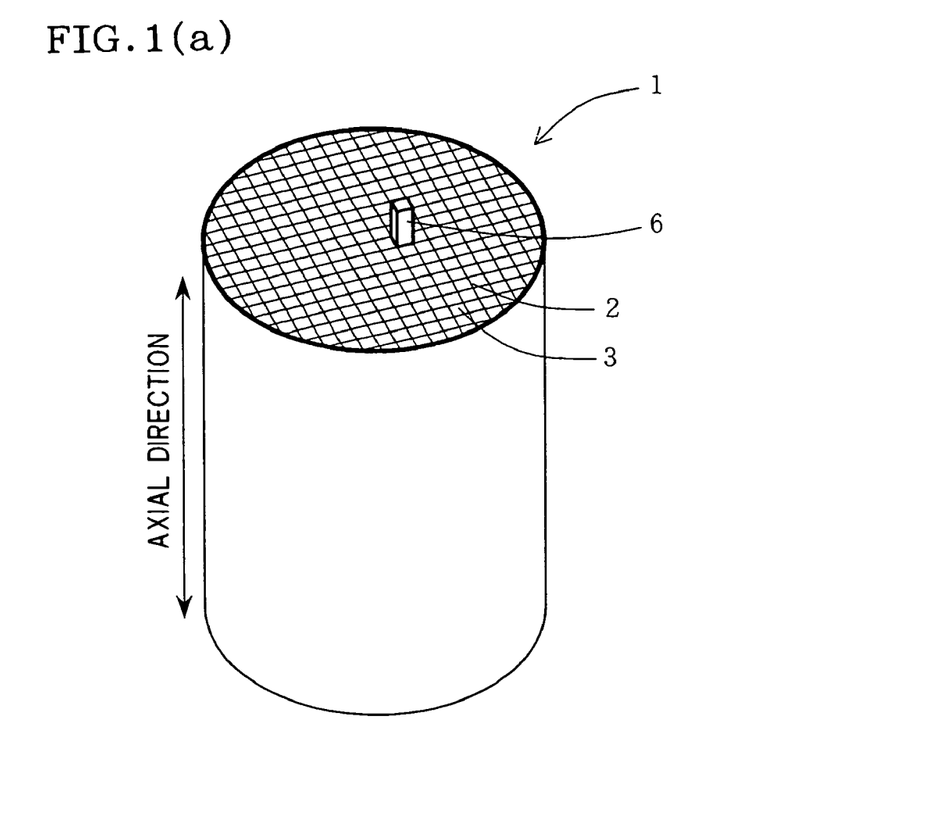
FIG. 1(a) is a schematic perspective view showing one embodiment in which plugging members are inserted in cells of a honeycomb structure in the present invention.
Figure 1B:
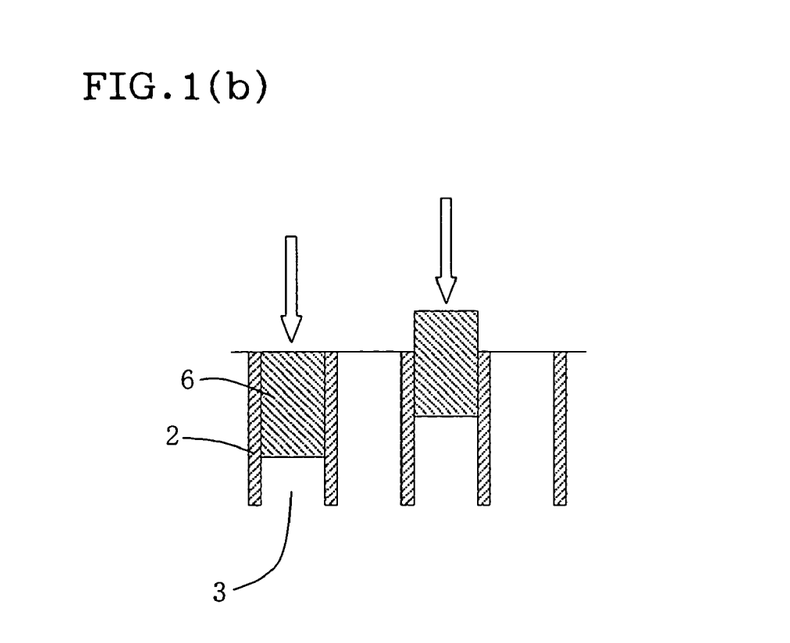
FIG. 1(b) is a partially enlarged sectional view parallel to the axial direction of the honeycomb structure of FIG. 1(a)
Figure 2A:
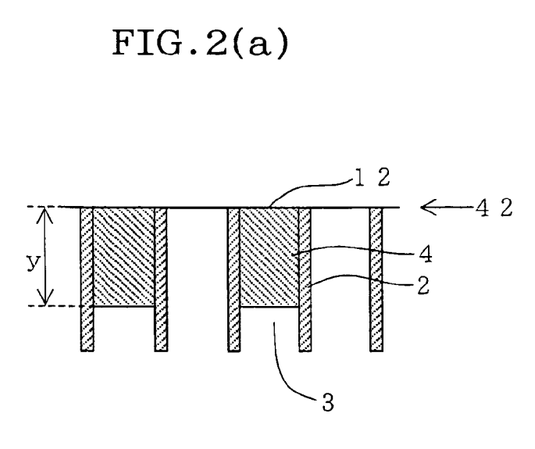
FIG. 2(a) is a partially enlarged axially horizontal sectional view schematically showing one embodiment of a honeycomb plugged structure manufactured according to the present invention.

For important characteristics of the present invention, a plugging member 6 molded beforehand in predetermined shape is inserted in cell 3 of a honeycomb structure 1 as shown in FIGS. 1(a) and 1(b), and the inserted plugging member is bonded to partition walls 2 surrounding the plugging member, to form plug portion 4 as shown in FIG. 2(a).

Figure 2B:
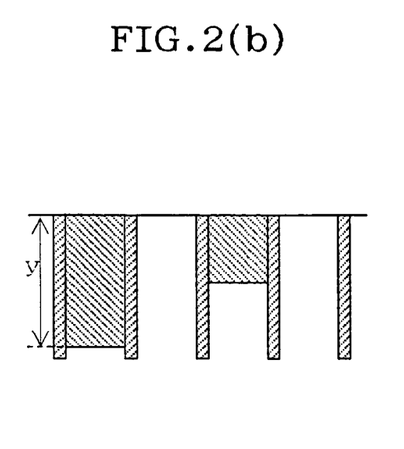
FIG. 2(b) is a partially enlarged sectional view parallel to the axial direction schematically showing another embodiment of a honeycomb plugged structure manufactured by the present invention.

By such a method, the shape of the plug portion 4 can easily be formed in exactly desired shape. For example, as shown in FIG. 2(a), when depths "y" of a plurality of plug portions 4 are set to be certain and exact depths, a plurality of plugging members having the same length may be prepared and inserted in desired cells. Moreover, as shown in FIG. 2(b), when the depths "y" of the plurality of plug portions 4 are changed at random or in a certain pattern, the plugging members having different lengths may be prepared and inserted in the cells at random or in the certain pattern. According to the present invention, the plug portion having the desired depth can easily be formed.

A method for inserting the plugging member in the predetermined cell is not especially limited. Examples of the method includes: a method for inserting the plugging members one by one or collectively in the predetermined cells; and a method for masking cells other than the predetermined cells in an end face of the honeycomb structure, disposing a predetermined number of plugging members on the end face, and vibrating the honeycomb structure to insert the plugging members in the predetermined cells.

Figure 3:
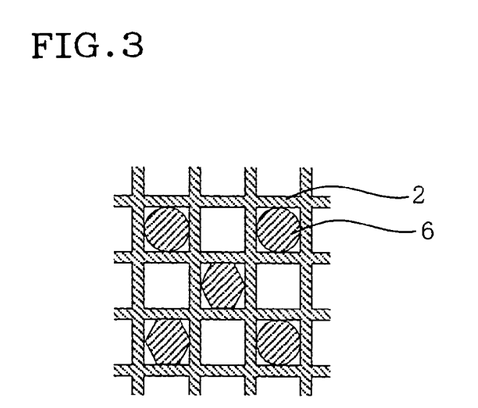
FIG. 3 is a partially enlarged sectional view schematically showing one embodiment in which the plugging members are being inserted in the cells of the honeycomb structure, in the present invention.

The shape of the plugging member is not especially limited as long as the plugging member can be inserted in the cell, but in addition to a rectangular prism shape shown in FIG. 1(a), columnar shapes such as prism shapes including a triangular prism shape and a hexagonal prism shape, and cylindrical column shapes are preferable from a viewpoint that a sufficient bond area between the plugging member and the partition wall is secured. In this case, a sectional shape of the plugging member preferably corresponds to that of the cell. Moreover, a dimension of a section of the plugging member is formed to be smaller than that of the cell by 0.01 to 0.2 mm, especially by 0.01 to 0.1 mm from a viewpoint of facilitation of insertion. Additionally, as shown in FIG. 3, the sectional shape of the member does not have to correspond to that of the cell. When a bond material described later is filled in a gap between the partition wall and the plugging member, the plug portion can be formed. When it is important to inhibit a pressure loss, a function of a through slot described later may preferably be imparted to the gap by not filling in the gap.

Figure 4A:
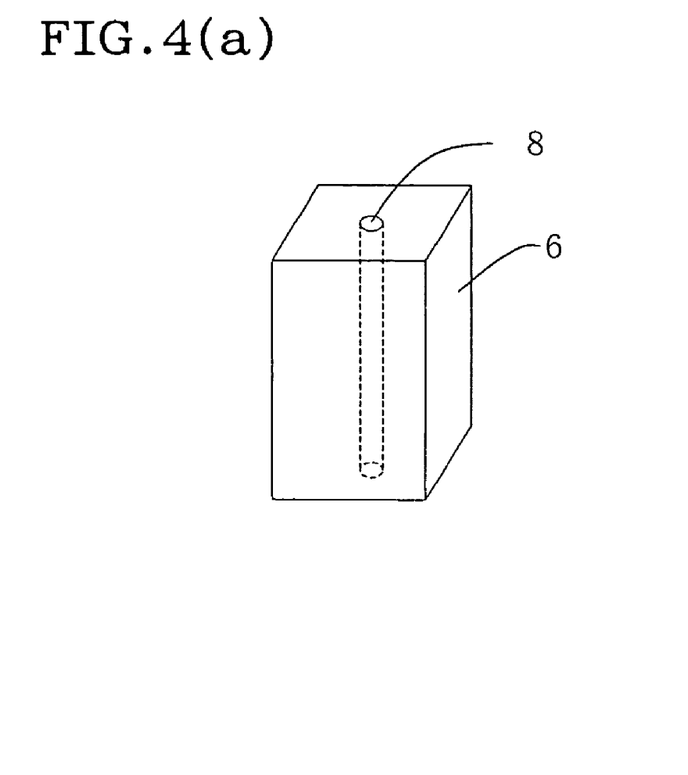
FIG. 4(a) is a schematic perspective view showing one embodiment of the plugging member according to the present invention.
Figure 4B:
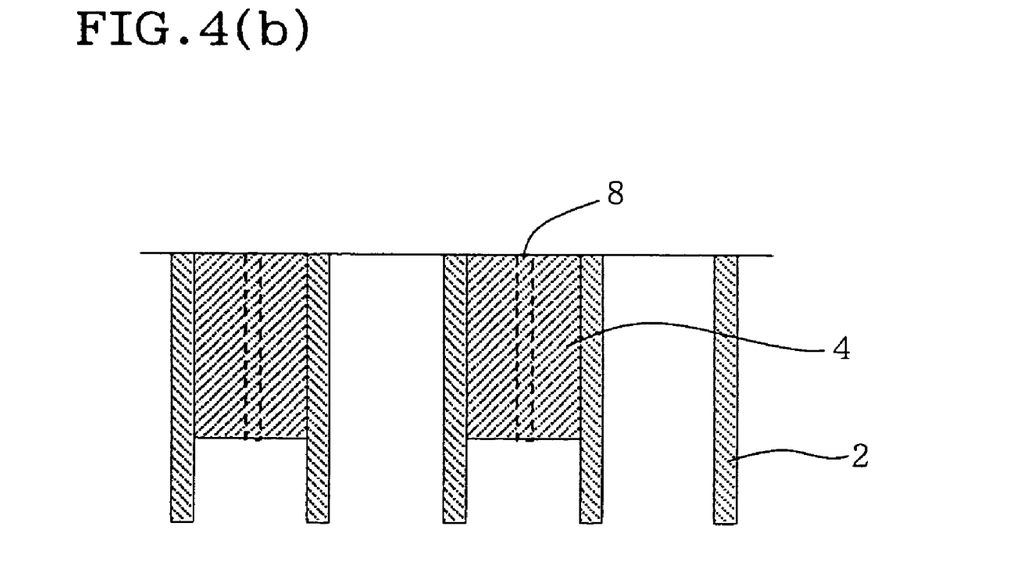
FIG. 4(b) is a partially enlarged sectional view parallel to the axial direction schematically showing a plug portion formed by the plugging member of FIG. 4(a)

Moreover, as shown in FIG. 4(a), the plugging member preferably includes a through slot 8. In this case, as shown in FIG. 4(b), the plugging member is preferably inserted so that the through slot 8 extends through an axial direction so as to form the plug portion 4. When the cells are plugged by such a method, a certain fluid passes through the plug portion in this structure, and the pressure loss can be inhibited. When it is more important to inhibit the pressure loss, the structure becomes effective.

Figure 5A:
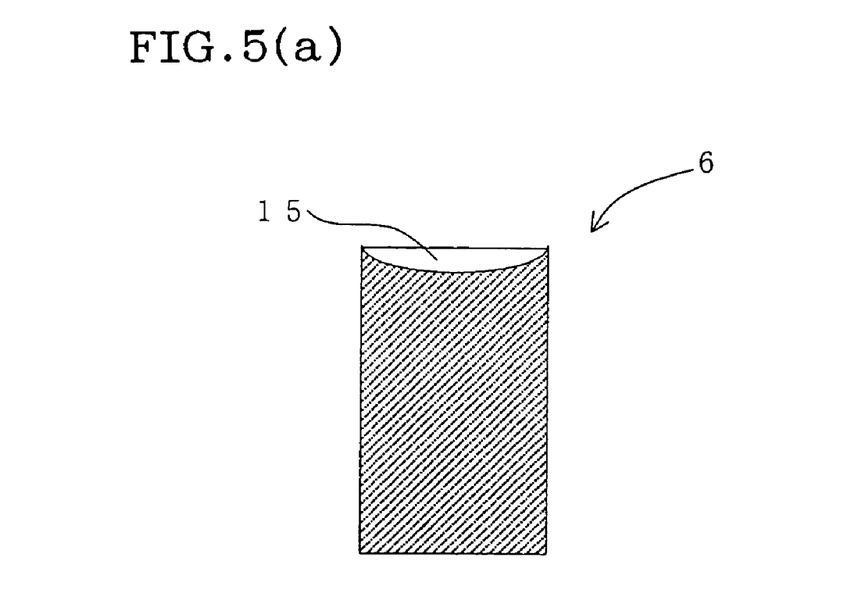
FIG. 5(a) is a sectional view parallel to the axial direction schematically showing another embodiment of the plugging member according to the present invention.
Figure 5B:
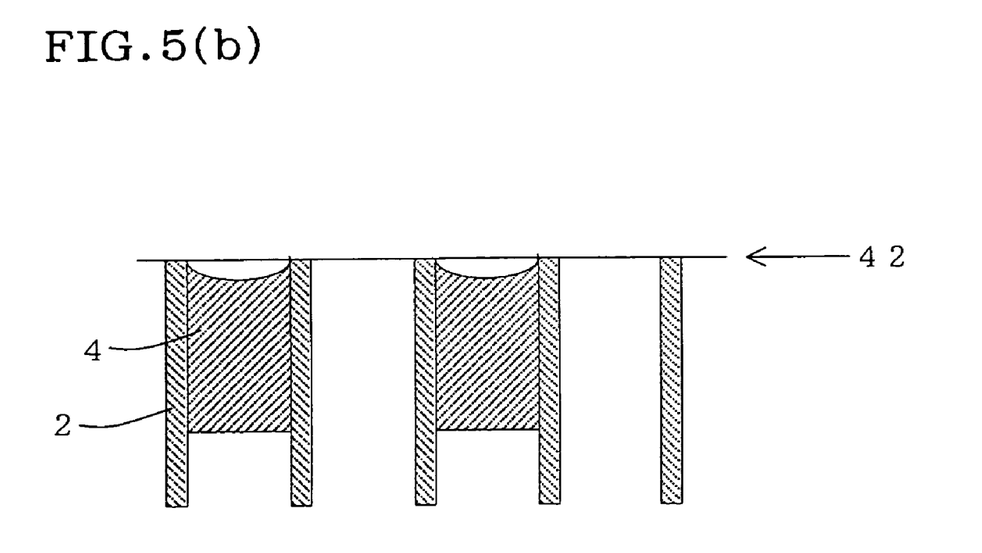
FIG. 5(b) is a partially enlarged sectional view parallel to the axial direction schematically showing a plug portion formed by the plugging member of FIG. 5(a)
Figure 6A:
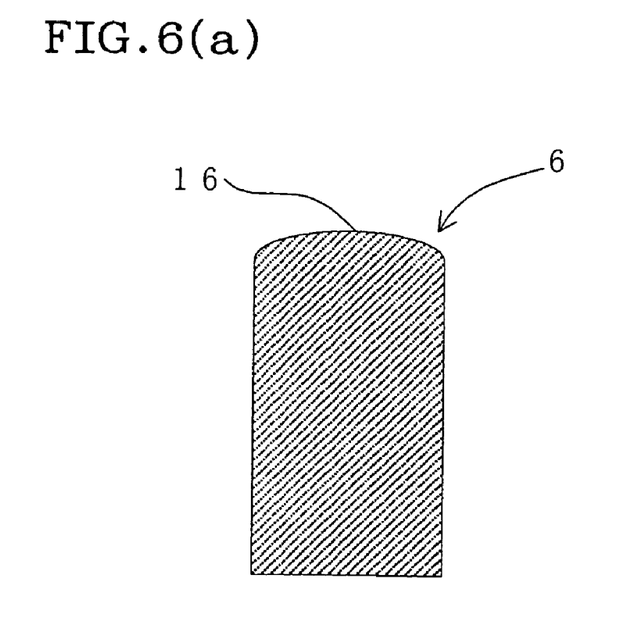
FIG. 6(a) is a sectional view parallel to the axial direction schematically showing still another embodiment of the plugging member according to the present invention.

Moreover, the plugging member 6 preferably includes a concave portion 15 as shown in FIG. 5(a), or a convex portion 16 as shown in FIG. 6(a). And as shown in FIG. 5(b) or 6(b), it is preferred that inserting the plugging member so that the concave or the convex portion forms a concave or a convex in relation to an arbitrary surface parallel to an end face 42 of the honeycomb structure, to form the plug portion 4.

As shown in FIG. 5(b), for the honeycomb plugged structure in which the plug portions 4 including the concave portion is formed in the end face 42, when the end face 42 is used as an exhaust gas inflow face where the temperature becomes higher in DPF, soot is accumulated in the concave portions disposed in the inflow face. By burning the accumulated soot, regeneration of the DPF by the burning soot can sometimes be promoted.

Figure 6B:
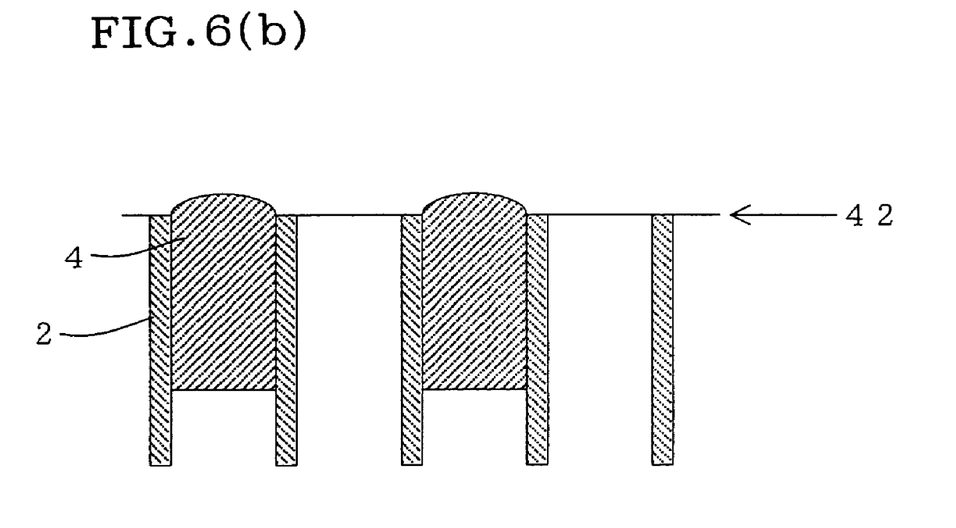
FIG. 6(b) is a partially enlarged sectional view parallel to the axial direction schematically showing a plug portion formed by the plugging member of FIG. 6(a)

Moreover, as shown in FIG. 6(*b*), for the honeycomb plugged structure in which the plug portion 4 including the convex portions is formed in the end face 42, when the end face 42 is used as the exhaust gas inflow face in filters, inflow resistance of fluid can be reduced, and this can contribute to inhibition of the pressure loss.

Figures 8A, 8B:
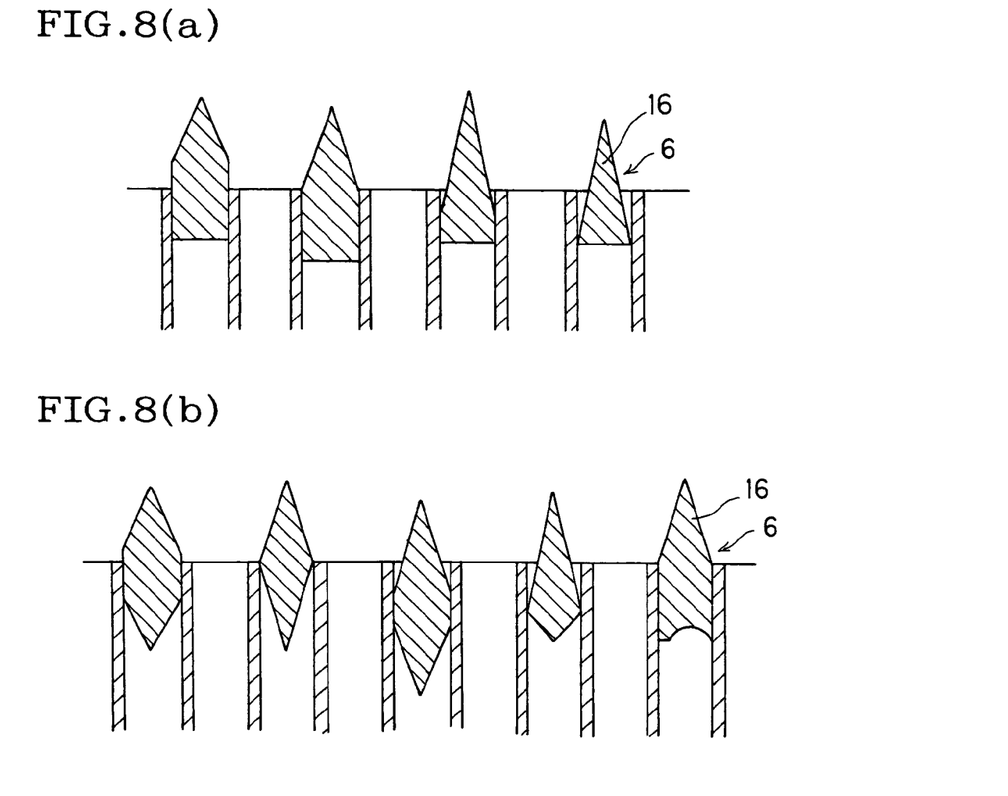
FIG. 8(a) is a partially enlarged sectional view parallel to the axial direction schematically showing still another embodiment of the honeycomb plugged structure manufactured by the present invention.
FIG. 8(b) is a partially enlarged sectional view parallel to the axial direction schematically showing still another embodiment of the honeycomb plugged structure manufactured by the present invention.
Figures 9A, 9B:
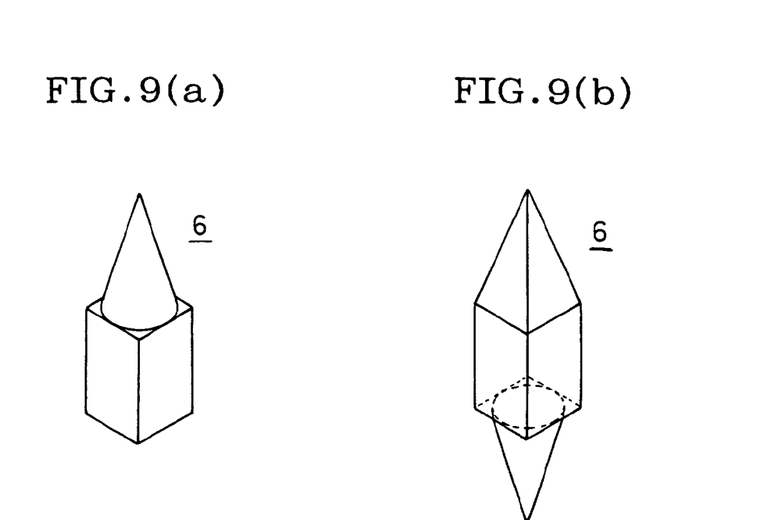
FIG. 9(a) is a sectional view parallel to the axial direction schematically showing still another embodiment of the plugging member according to the present invention.
FIG. 9(b) is a sectional view parallel to the axial direction schematically showing still another embodiment of the plugging member according to the present invention.

As shown in FIGS. 8(*a*) and 8(*b*), when the convex portion 16 is formed in a pyramid or conical shape, the inflow resistance of the fluid can further be reduced, and the pressure loss can further be reduced. In this case, as shown in FIGS. 9(*a*) and 9(*b*), a head portion of the plugging member can be formed in a sectional shape different from that of a portion other than the head portion. For example, the head portion is formed in the conical or pyramid shape, the other portion can be formed in the columnar shape such as prism shapes, and an arbitrary combination can be formed. The plugging member may also preferably be formed in a spherical shape because the plugging member can easily be inserted by the vibration described above. In this case, it is preferable to use the bond material described later because a sufficient bond strength is given.

Figure 7A:
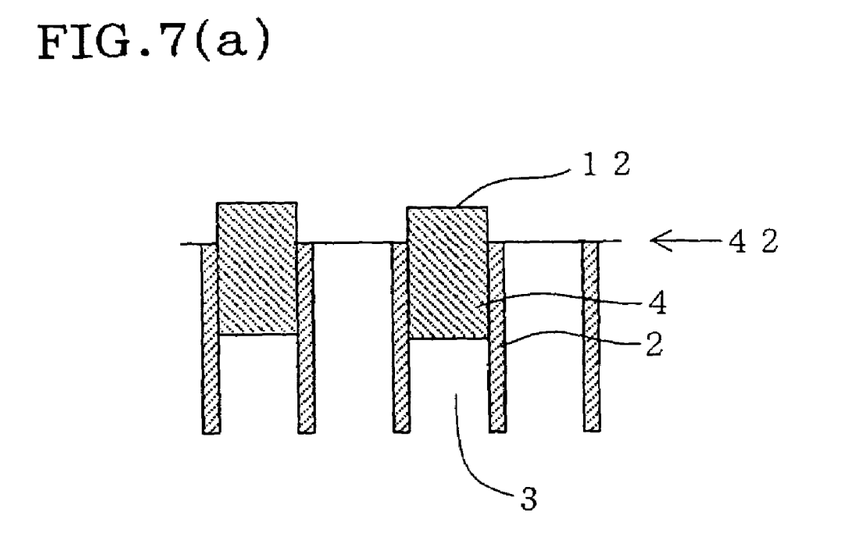
FIG. 7(a) is a partially enlarged sectional view parallel to the axial direction schematically showing still another embodiment of the honeycomb plugged structure manufactured by the present invention.
Figure 7B:
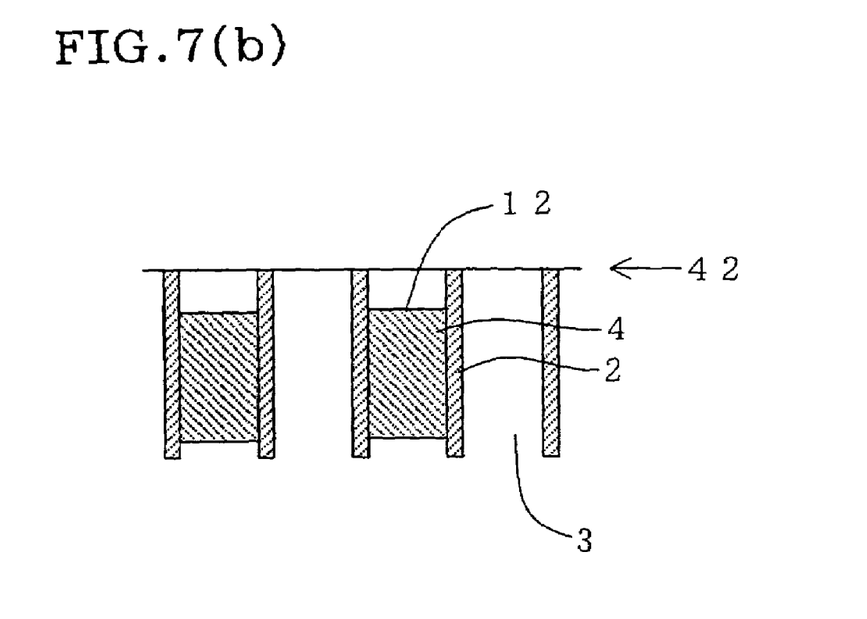
FIG. 7(b) is a partially enlarged sectional view parallel to the axial direction schematically showing still another embodiment of the honeycomb plugged structure manufactured by the present invention.

The insertion position of the plugging member in the axial direction is not especially limited, but as shown in FIG. 2(*a*), it is generally preferable to insert the plugging member so that the end surface 42 of the honeycomb plugged structure forms the same plane as that of end 12 of the plug portion. However, as shown in FIG. 7(*a*), it is also preferable to insert the plugging member so that the end 12 of the plug portion projects from the end surface 42 of the honeycomb plugged structure, in such a sense that the convex portion is formed. As shown in FIG. 7(*b*), the plugging member is also preferably inserted so as to form a shape that the plugging member is pushed into the inside of the honeycomb plugged structure, in such a sense that the concave portions are formed.

The position of the cell into which the plugging member is to be inserted is not especially limited. When the honeycomb plugged structure is used as the filter, in general, as shown in FIGS. 11(*b*) and 11(*c*), the plugging members are inserted in the cells to form the plug portion alternately so as to make a checkered pattern in one end face. For the remaining cells in which any plug portion is not formed, the plugging members are inserted so as to form the plug portions in the other end face on an opposite side. Accordingly, the cells disposed adjacent to each other are plugged in the end faces on the opposite sides.

It is to be noted that only the predetermined plug portions are formed in the method of the present invention, and the other cells may also be plugged in a conventional method using slurry. As shown in FIG. 1(*a*), when the honeycomb structure has a round sectional shape, a cell shape in the vicinity of an outer periphery easily becomes irregular. Therefore, such cells may also preferably be plugged in the method using the slurry.

A material of the plugging member is not especially limited, and any material such as ceramic, metal, and resin can be used in accordance with application of the honeycomb plugged structure. However, considering from heat resistance or thermal shock resistance, ceramic or metal is preferable. In the application such as DPF exposed at a higher temperature, ceramic is especially preferable. Example of the preferable ceramic includes cordierite, alumina, mullite, silicon nitride, silicon carbide and the like. To finally bond the plugging member to the partition wall of the honeycomb structure, the major component of the member is preferably the same as that of the honeycomb structure, and the same ceramic is especially preferably used as the major component. It is to be noted that the major component means a single component or a plurality of components occupying 50% or more by mass in the whole.

Moreover, the plugging member also preferably has a catalytic activity. When an unburnt component in the exhaust gas is purified or the soot deposited in the DPF is burnt to regenerate the DPF, the burning of the soot deposited in the vicinity of the plug portion can be promoted. Therefore, the plugging member preferably carries or contains at least one of catalytic components such as platinum, rhodium, palladium, and titanium. At this time, all the plugging members in the plug portions do not necessarily have the catalytic activity. Only at least the plugging members of some plug portions may have the catalytic activity as needed.

A method of forming the plugging member is not especially limited, and various molding methods such as extrusion molding, press molding, and injection molding can be used alone or in combination. When the plugging member has a columnar shape, the extrusion molding is preferable. By cutting the extrudate successively with an arbitrary length, the plugging member can easily be formed.

The plugging member having the concave or convex portion can preferably be molded by the press molding after the extrusion molding, or only by the press molding. Alternatively, after the plugging members are formed as shown in FIG. 2(*a*) or 7(*a*), the concave or convex portion may also be formed in the arbitrary shape by machining operations such as grinding. In this case, size or shape of the concave or convex portion does not have to be especially uniform, and an arbitrary shape can be made in consideration of required performances such as the pressure loss or ease of manufacturing.

When the plugging member of cordierite is prepared, a raw material is extruded to generate orientation, and a coefficient of thermal expansion of the formed plugging member can be lowered. The plugging member including the through slot can be formed by extrusion so as to form the through slot. When the plugging member has the concave or convex portion, the raw material may directly be press-molded, or an extruded material may also be processed by the press molding. When the raw material of the plugging member is a ceramic powder, a ceramic fired body is preferably formed by firing after the molding. Alternatively, the plugging member before fired is inserted in the honeycomb structure before or after fired, and may subsequently be fired. In this case, it is preferable to insert the molded and subsequently dried plugging member into the honeycomb structure from a viewpoint of imparting a certain strength to the honeycomb structure and facilitating the insertion.

As described above, after inserting the plugging member into predetermined position of the honeycomb structure, the plugging member is bonded to the partition walls surrounding the member. A bonding method is not especially limited. However, they can be bonded by injecting the bond material between the inserted plugging member and the partition wall to dispose the bond material between the plugging member and the peripheral partition wall, then the heating the body to dry and/or fre. Alternatively, they can be bonded by coating, with the bond material, the partition walls surrounding the cell where the plugging member is to be inserted, and inserting the plugging member, then heating the body to dry and/or fire. Additionally, without using any bond material, they can sometimes be bonded by the heating. When the honeycomb structure and the plugging member contain the same ceramic as the major component, they may also be bonded by the firing without using any bond material. In this case, when at least one of the honeycomb structure and the plugging member is not fired, and a water-soluble binder is used, the bond portion is preferably wetted or moisturized with water before or after inserting the plugging member. Accordingly, more satisfactory bonded state can be obtained.

The bond material is not especially limited. For example, ceramic, metal, resin, and the like can be used, but ceramic or metal is preferable from a viewpoint of heat resistance and the like, and especially the ceramic is preferable. Moreover, from a viewpoint of enhancement of affinity of the bonded portion, the major component of the bond material is preferably the same as that of at least one of the honeycomb structure and the plugging member, and the major components of these three are especially preferably the same. The bond material is preferably used in a fluid form such as the slurry, and is preferably injected between the partition wall and the plugging member, or preferably applied to the partition wall.

Especially the shape or material of the honeycomb structure in the present invention is not limited as long as the honeycomb structure comprises a plurality of cells partitioned by the partition walls 2 and extending through the axial direction, for example, as shown in FIG. 1(a). The sectional shape can appropriately be determined, for example, from a round shape, oval shape, racetrack shape, quadrangular shape, and the like in accordance with the application and installation place. The sectional shape of the cell can be polygonal shapes such as triangular, quadrangular, and hexagonal shapes, or substantially round shapes such as round and oval shapes. A cell density can be set, for example, to about 6 to 2000 cells/square inch (0.9 to 311 cells/cm$^2$), preferably 50 to 1000 cells/square inch (7.8 to 155 cells/cm$^2$). A material of the partition wall is not especially limited. However, ceramic and metal are preferable from a viewpoint of heat resistance and the like. When, the honeycomb structure is used as a catalyst substrate or a filter, the partition wall is preferably porous.

For the honeycomb structure, a powder of at least one type of material selected from a group consisting of various ceramics such as cordierite, mullite, alumina, spinel, silicon carbide, silicon carbide-cordierite based composite material, silicon-silicon carbide based composite material, silicon nitride, lithium aluminum silicate, aluminum titanate, and metals such as an Fe—Cr—Al-based metal, and a combination thereof can be used as the raw material. To the material, binders such a methyl cellulose and hydroxypropoxyl methyl cellulose are added, further a surfactant and water are added to form a puddle having plasticity. The puddle is extruded to form a honeycomb shape, or the honeycomb shape is formed and then fired, whereby the honeycomb structure can be prepared.

The present invention is described in more detail below by way of Examples. However, the present invention is not restricted to these Examples.

EXAMPLE 1

The binder, surfactant, and water were added to the cordierite raw material, mixed, and kneaded to form the puddle. Subsequently, steps of extrusion molding and drying were carried out to obtain an unfired honeycomb structure having a cylindrical shape with a diameter of 144 mm and length of 152 mm, a square cell shape, a cell density of 46 cells/cm$^2$, and a partition wall thickness of 0.3 mm. Moreover, in the similar steps, unfired plugging members having a rectangular prism shape with one side of 1.1 mm and a length of 2.5 mm were prepared. In one end face of the honeycomb structure, the plugging members were inserted to plug cells alternately in a checkered pattern form, and for the remaining cells, the plugging members were similarly inserted in the end face on the opposite side. For the cells having irregular cell-shapes in the vicinity of the outer periphery, the cells were plugged by conventional method using the slurry. After injecting the bond material, which is the slurry containing the cordierite raw material, between each plugging member and the partition wall, this honeycomb structure was fired, to obtain the honeycomb plugged structure.

EXAMPLES 2 and 3

In Example 2, the honeycomb plugged structure was obtained in the same manner as in Example 1 except that the length of the plugging member was set to 5 mm and the plugging members were extruded, dried, and then fired. In Example 3, the honeycomb plugged structure was obtained in the same manner as in Example 1 except that the lengths of the plugging members were set at random in a range of 2 mm to 15 mm and the plugging members were inserted in the cells.

(Hot Vibration Test)

Combustion gas of propane was passed through the honeycomb plugged structure obtained in Examples 1 to 3 to heat the honeycomb plugged structures at 900° C., and the honeycomb plugged structures were vibrated at 200 Hz, 50 G in the axial direction. After 200 hours of hot vibration test, the honeycomb plugged structures were observed. As a result, problems such as drop-off of the plug portions were not seen in all the honeycomb plugged structures.

As described above, in a method for plugging a cell of a honeycomb structure of the present invention and a method for manufacturing a honeycomb plugged structure, plug portions having desired depths and/or shapes can exactly and easily be formed. The methods are useful, when the honeycomb structure requires the plug portion such as in filters represented by DPF.

What is claimed is:

1. A method for plugging a cell of a honeycomb structure having a plurality of cells surrounded by partition walls and extending through an axial direction, the method comprising steps of:
    forming a plugging member by extrusion molding and/or press molding;
    inserting the plugging member formed in a predetermined shape into the cell while keeping the predetermined shape;
    bonding the plugging member to the partition walls surrounding the plugging member, to form a plug portion, wherein the bonding is achieved by disposing a bond material between the inserted plugging member and the partition walls surrounding the plugging member and firing the bond material, wherein a major component of the plugging member is ceramic.

2. The method for plugging the cell of the honeycomb structure according to claim 1, wherein the plugging member is an unfired ceramic molded body.

3. The method for plugging the cell of the honeycomb structure according to claim 1, wherein the plugging member is a fired ceramic body.

4. The method for plugging the cell of the honeycomb structure according to claim 1, wherein the plugging member has a columnar shape.

5. The method for plugging the cells of the honeycomb structure according to claim 1, wherein the plugging member comprises a concave portion, and the plug portion is formed so that the concave portion forms a concave in relation to a surface parallel to an end face of the honeycomb structure.

6. The method for plugging the cell of the honeycomb structure according to claim 1, wherein the plugging member comprises a convex portion, and the plug portion is formed so that the convex portion forms a convex in relation to a surface parallel to an end face of the honeycomb structure.

7. The method for plugging the cell of the honeycomb structure according to claim 6, wherein the convex portion comprises a portion having a pyramid shape or a conical shape.

8. The method for plugging the cell of the honeycomb structure according to claim 1, wherein the plugging member has a spherical shape.

9. The method for plugging the cell of the honeycomb structure according to claim 1, wherein a major component of the bond material is the same as that of at least one of the honeycomb structure and the plugging member.

10. The method for plugging the cell of the honeycomb structure according to claim 1, wherein the plugging member contains, as the major component, at least one material selected from a group consisting of cordierite, alumina, mullite, silicon nitride, and silicon carbide.

11. The method for plugging the cell of the honeycomb structure according to claim 1, wherein the plugging member has a catalytic activity.

12. The method for plugging the cell of the honeycomb structure according to claim 1, wherein the plugging member carries or contains a catalytic component.

13. The method for plugging the cells of the honeycomb structure according to claim 1, wherein the plugging member and the honeycomb structure contain the same ceramic as the major component.

14. A method for manufacturing a honeycomb plugged structure, comprising:

plugging at least a certain cells of a honeycomb structure having a plurality of cells surrounded by partition walls and extending through an axial direction, the plugging proces comprising steps of;

forming a plugging member by extrusion molding and/or press molding;

inserting the plugging member formed in a predetermined shape into the cell while keeping the predetermined shape;

bonding the plugging member to the partition walls surrounding the plugging member, to form a plug portion, wherein the bonding is achieved by disposing a bond material between the inserted plugging member and the partition walls surrounding the plugging member and firing the bond material, wherein a major component of the plugging member is ceramic.

\* \* \* \* \*